US006380473B2

(12) United States Patent
Uehara

(10) Patent No.: US 6,380,473 B2
(45) Date of Patent: Apr. 30, 2002

(54) MUSICAL INSTRUMENT EQUIPPED WITH SYNCHRONIZER FOR PLURAL PARTS OF MUSIC

(75) Inventor: Haruki Uehara, Shizuoka (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/758,579

(22) Filed: Jan. 10, 2001

(30) Foreign Application Priority Data

Jan. 12, 2000 (JP) ....................................... 2000-003956

(51) Int. Cl.[7] ........................... G09B 15/02; G10H 1/26

(52) U.S. Cl. .............................. 84/609; 84/610; 84/478

(58) Field of Search ................... 84/609–614, 634–638, 84/649–652, 666–669, 470 R, 477 R, 478

(56) References Cited

U.S. PATENT DOCUMENTS 5,521,323 A 5/1996 Paulson et al.

*Primary Examiner*—Stanley J. Witkowski
(74) *Attorney, Agent, or Firm*—Morrison & Foerster

(57) ABSTRACT

An electronic synchronizer sequentially reads out multi-track music data codes selectively assigned to an automatic player piano and an electronic sound generating system and already stored cue flags in arbitrary multi-track music data codes, and checks the fingering on the keyboard to see whether or not a pianist depresses the black/white key assigned the note marked with the cue flag, if the pianist depresses the black/white key within a predetermined time period, the electronic synchronizer supplies the multi-track music data codes concurrently to the automatic player piano and the electronic sound generating system for giving a guide to the pianist and the accompaniment: However, if not, the electronic synchronizer delays the data transfer so as to make the guide and the accompaniment synchronous with the fingering.

20 Claims, 12 Drawing Sheets

| TRACK | PART |
| --- | --- |
| Tr0 | PRINCIPAL MELODY |
| Tr1 | ACCOMPANIMENT |
| ⋮ | ⋮ |
| Tr15 | NONE |

Fig. 4

| NOTE NUMBER |
|---|
| 65 |

Fig. 7A

| TRACK | EVENT | NOTE NUMBER | TARGET TIME |
|---|---|---|---|
| Tr0 | NOTE - ON | 67 | t8 |
| Tr1 | NOTE - ON | 67 | t8 |

Fig. 7B

| NOTE NUMBER | WAITING TIME | FLAG TIME |
|---|---|---|
| 67 | 2 | t8 |

Fig. 7C

MUSICAL INSTRUMENT EQUIPPED WITH SYNCHRONIZER FOR PLURAL PARTS OF MUSIC

FIELD OF THE INVENTION

This invention relates to a musical instrument and, more particularly, to a musical instrument and a support equipment for the musical instrument.

DESCRIPTION OF THE RELATED ART

Various support systems have been proposed for music players. A support equipment is associated with a keyboard musical instrument, and previously notifies the black/white keys to be depressed to the player. Another support equipment is used for an ensemble. While a trainee is playing a melody, the support equipment generates tones for the accompaniment.

Yet another support equipment also generates the tones for the accompaniment, and synchronizes the accompaniment with the melody. Even if a trainee is out of the tempo in a certain passage, the support equipment produces the tones at irregular intervals, and makes the accompaniment synchronous with the melody. The support equipment is hereinbelow referred to as "electronic synchronizer".

The prior art electronic synchronizer controls the tone generation as follows. The prior art electronic synchronizer has a controller, a data storage and an array of sensors. A set of music data codes representative of the melody and the accompaniment is stored in the data storage, and the sensors monitor the motion of the black/white keys. The set of music data codes is divided into data groups assigned to note groups of a tune. The melodic subject or the chord is changed at the boundary between the note groups. While a trainee is playing the melody, the sensors notifies the depressed keys to the controller, and the controller checks the present data group to see whether the trainee depresses a black/white key assigned the note identical with the last note of the associated note group. If the trainee has not depressed the black/white key, the controller retards the progression of the accompaniment. Thus, the prior art electronic synchronizer makes the accompaniment synchronous with the melody only at the boundaries between the adjacent note groups.

A problem is encountered in the prior art electronic synchronizer in that the accompaniment does not follow time lag or temporal advance intentionally introduced into the performance. Some players want to individualize their performance. Such an individualistic player intentionally retards or advances the generation of certain tones in the passage. If the time lag is introduced at the boundary between the note groups, the prior art electronic synchronizer is responsive to the individualistic player, and makes the accompaniment synchronous with the melody. However, when the individualistic player introduce the time lag at the boundary between two tones in a certain note group, the prior art electronic synchronizer can not respond to the individualistic player.

SUMMARY OF THE INVENTION

It is therefore an important object of the present invention to provide a support system, which makes a part of music synchronous with another part performed by a player at any point in the music.

In accordance with one aspect of the present invention, there is provided a synchronizer for synchronizing a first musical instrument with a second musical instrument comprising a first data source storing a first piece of sequence data including a first series of pieces of music data used for producing first tones for a part of a score and pieces of synchronous data selectively associated with the pieces of music data of the first series and a second piece of sequence data including a second series of pieces of music data used for producing tones for another part of the score and synchronously outputting the first piece of sequence data and the second piece of sequence data, a second data source successively outputting pieces of reference data representative of an actual performance on the second musical instrument for producing the first tones, and a controller connected to the first data source, the second data source and the first musical instrument, comparing the pieces of synchronous data with certain pieces of reference data corresponding to the pieces of music data associated with the pieces of synchronous data to see whether or not the second data source timely outputs the certain pieces of reference data and controlling a data transfer of the second series of pieces of music data to the first musical instrument so as to make the another part synchronous with the actual performance.

BRIEF DESCRIPTION OF THE DRAWINGS

The features and advantages of the support equipment for a musical instrument will be more clearly understood from the following description taken in conjunction with the accompanying drawings in which:

FIG. 4 is a view showing a table between tracks and parts of a tune;

FIGS. 7A to 7C are views showing buffers used in a data processing;

DESCRIPTION OF THE PREFERRED EMBODIMENTS

Structure of Musical Instrument

Figure 1:
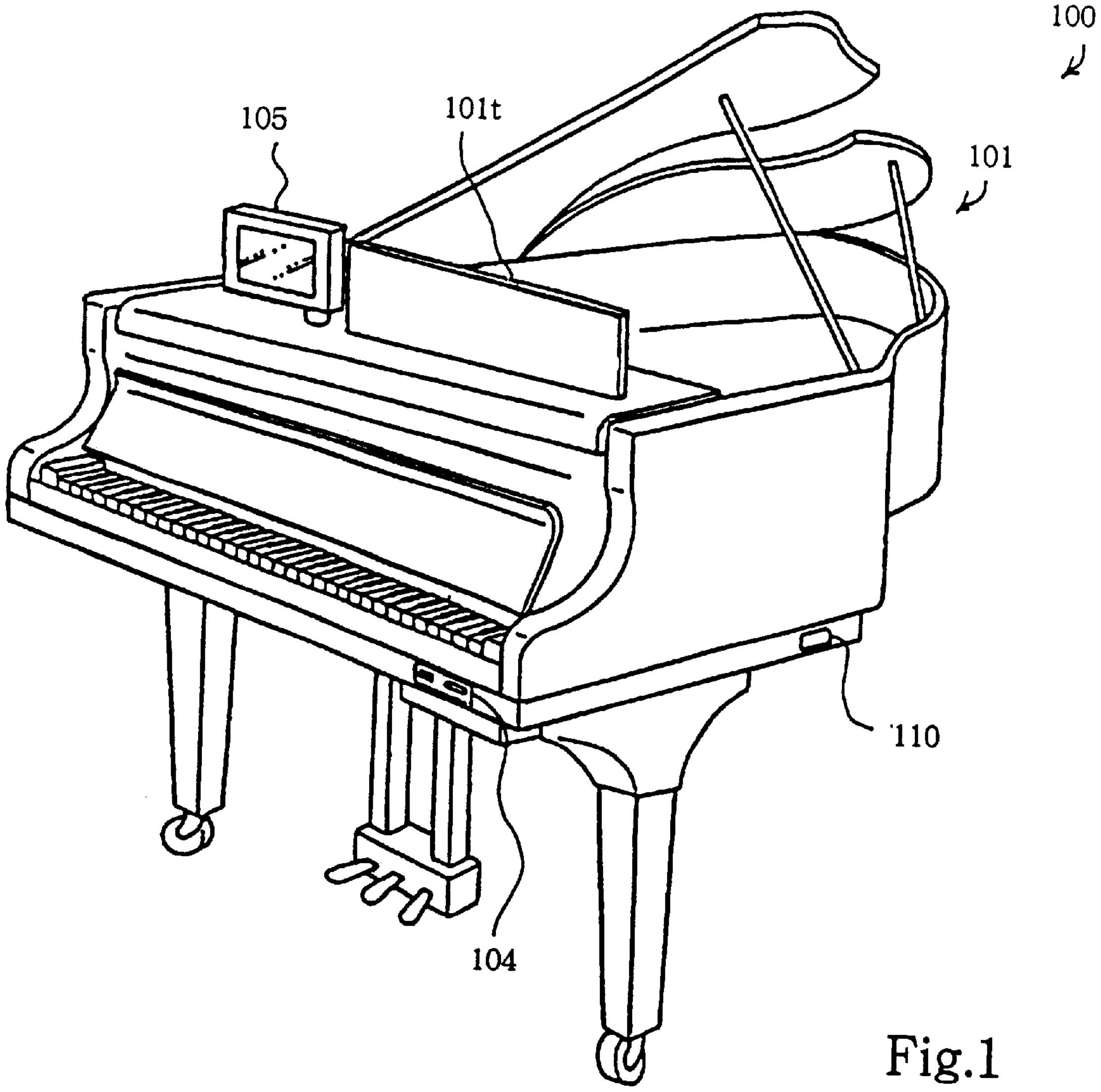
FIG. 1 is a perspective view showing the external appearance of an ensemble system according to the present invention.
Figure 2:
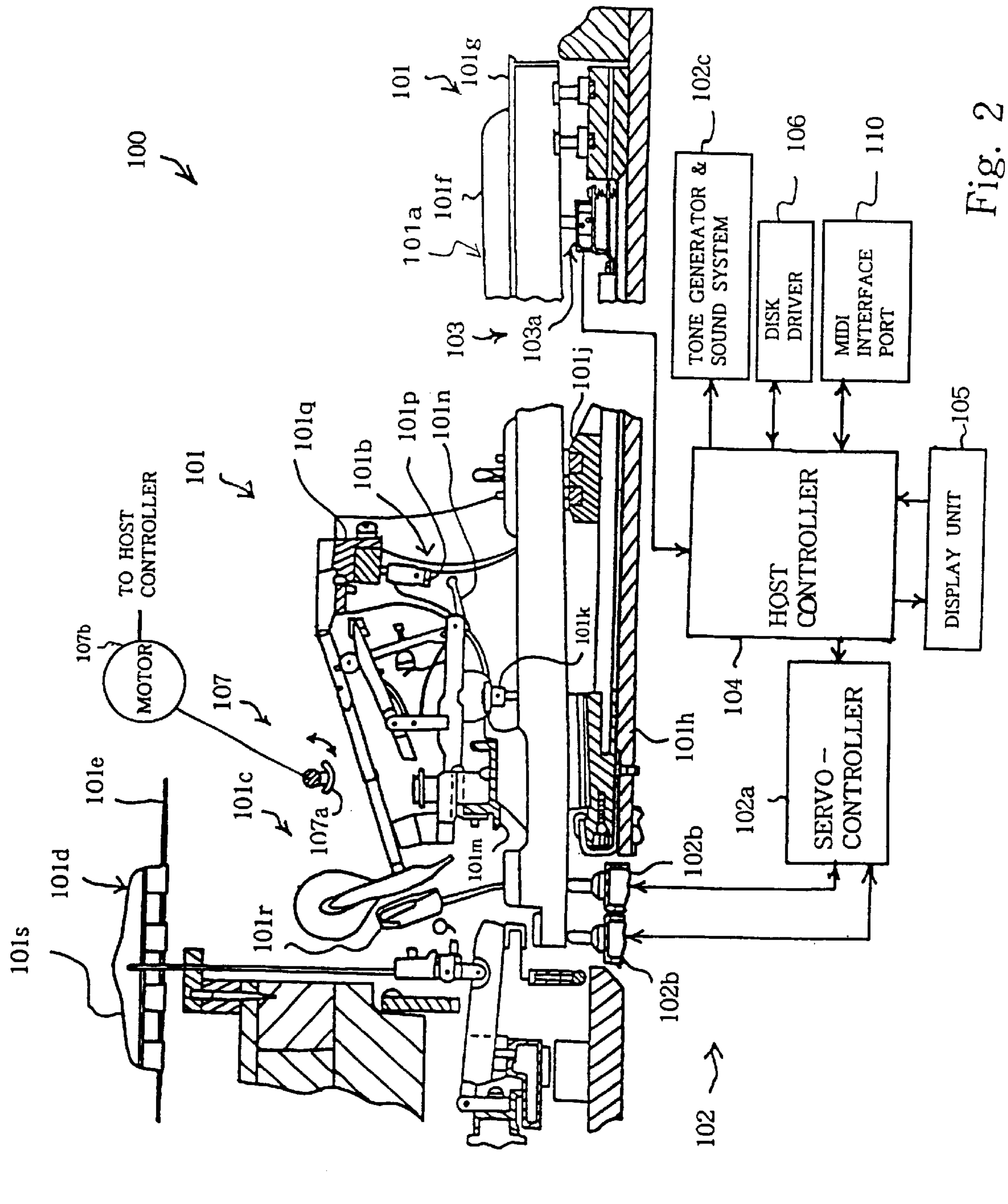
FIG. 2 is a cross sectional side view showing an automatic player piano forming a part of the ensemble system.

Referring to FIGS. 1 and 2 of the drawings, an electronic synchronizer embodying the present invention is associated with a keyboard musical instrument 100. The keyboard musical instrument 100 is fabricated on the basis of an automatic player piano. The keyboard musical instrument 100 is broken down into an acoustic piano 101, a playback system 102, an electronic sound generating system 103 and a silent system 107. A pianist plays a tune on the acoustic piano 101 through fingering, and the playback system 102 plays the tune on the acoustic piano 101 without the fingering. Namely, the playback system 102 reads out a set of music data codes representative of the tune from an information storage medium such as, for example, a CD-ROM (Compact Disk Read Only Memory) disk or a DVD (Digital Versatile Disk), and plays the tune as if the pianist plays it on the acoustic piano. The set of music data codes may be supplied through a communication line (not shown). The electronic sound generating system 103 produces an analog audio signal from music data codes, and electronic tones are produced from the analog audio signal. The music data codes may be supplied from the information storage medium, or produced in response to the fingering in real time fashion. The silent system 107 selectively establishes an acoustic sound mode and a silent mode in the keyboard musical instrument. The silent system 107 permits the pianist to play a tune on the acoustic piano 100 in the acoustic sound mode, and prohibits the acoustic piano 100 from producing the acoustic piano tones in the silent mode. While the pianist is playing a tune on the acoustic piano 100 in the silent mode, the electronic sound generating system 103 produces the electronic tones in response to the fingering, and the pianist confirms the fingering through the electronic tones. The playback system 102 may play a tune in the silent mode.

The acoustic piano 101 is similar to a standard grand piano, and includes a keyboard 101*a*, action mechanisms 101*b*, hammers 101*c*, damper mechanisms 101*d* and music strings 101*e*. These component parts 101*a* to 101*e* are linked with one another, and generate the acoustic piano tones. In detail, black keys 101*f* and white keys 101*g* are laid on the well-known pattern, and form in combination the keyboard 101*a*. The notes of the scale are respectively assigned to the black/white keys 101*f*/101*g*. The keyboard 101*a* is mounted on a key bed 101*h*. The black/white keys 101*f*/101*g* are turnable around a balance rail 101*j*, and are held in contact with the associated action mechanisms 101*b* by means of capstan screws 101*k*.

The action mechanisms 101*b* are rotatable around a center rail 101*m*. Each of the action mechanisms 101*b* includes a jack 101*n* and a regulating button 101*p*. When the jack 101*n* is brought into contact with the regulating button 101*p*, the jack 101*n* escapes from the associated hammer 101*c*, and the hammer 101*c* is driven for rotation around a shank flange rail 101*q*.

The hammers 101*c* have rest positions under the associated music string 101*e*, respectively, and strike the music strings 101*e* for generating the acoustic piano tones. Upon striking the associated music strings 101*e*, the hammers 101*c* rebound, and return toward the rest positions. The rebounding hammer 103 is gently received by a back check 101*r* on the way to the rest position, and the back check 101*r* guides the hammer 101*c* to the rest position after the depressed key 101*f*/101*g* is released.

The damper mechanisms 101*d* have respective damper heads 101*s*, and are actuated by the black/white keys 11*f*/11*g*, respectively. The damper heads 101*s* are held in contact with the associated music strings 101*e*, and prevent the music strings 101*e* from resonance with a vibrating music string 101*e*.

When the pianist depresses one of the black/white keys 101*f*/101*g*, the black/white key 101*f*/101*g* sinks toward the end position, and pushing the associated damper mechanism 101*d* upwardly. The damper head 101*s* is spaced from the associated music string 101*e*, and the music string 101*e* is allowed to vibrate. Thereafter, the jack 101*n* escapes from the associated hammer 101*c*, and the hammer 101*c* strikes the music string 101*e*. Thus, the component parts 101*a* to 101*d* are sequentially actuated for generating the acoustic piano tones as similar to the standard grand piano. A host controller 104, a display unit 105, a disk driver 106 and a MIDI interface port 110 are shared between the playback system 102 and the recording system 103, and the host controller 104 is further shared with the silent system 107 as will be hereinlater described in detail.

Figure 3:
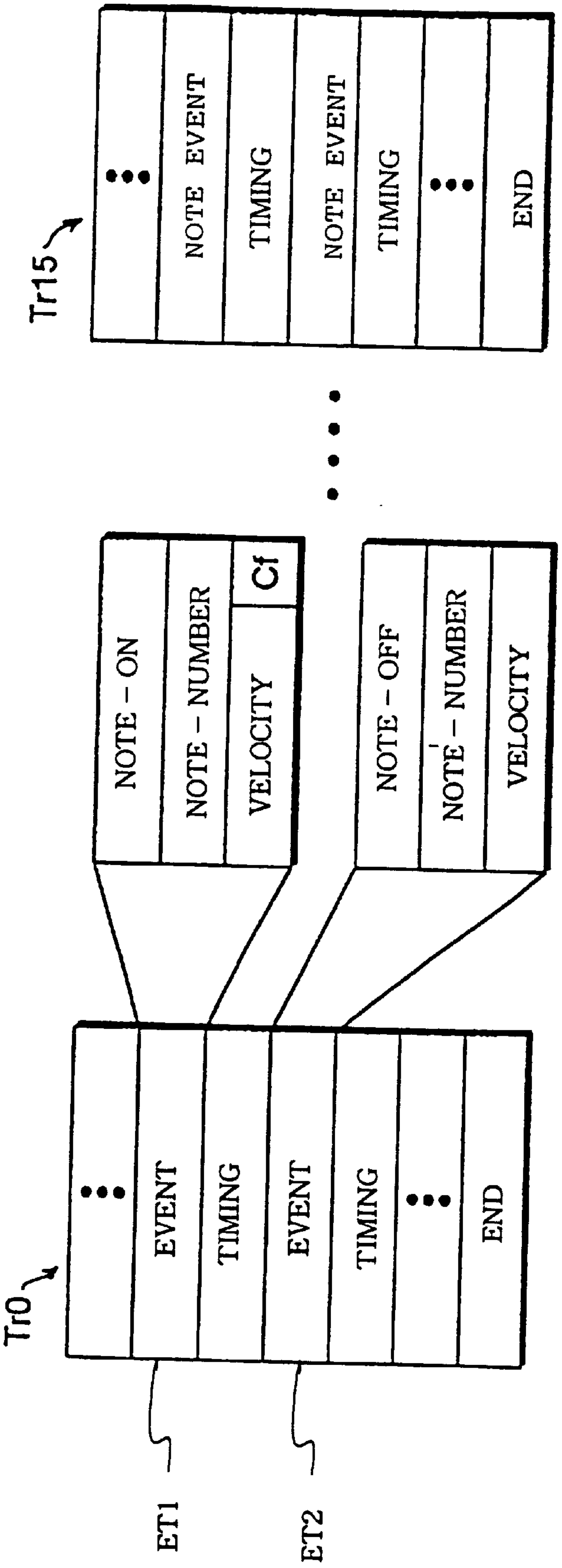
FIG. 3 is a view showing pieces of sequential data stored in MIDI music data codes.

Though not shown in the drawings, a central processing unit, a program memory, a working memory and a data interface are incorporated in the host controller 104, and the central processing unit is communicable with other electric components as indicated by arrows in FIG. 3. The central processing unit produces a set of music data codes from key position signals and control signals from a set of music data information. The set of music data codes represents the fingering on the keyboard 101*a*. The analog audio signal is produced from the set of music data codes in the real time fashion for the electronic sound generating system 103, or the control signals are produced from the set of music data codes for the playback system 102. The set of music data codes may be supplied through the MIDI interface port 110 to another musical instrument (not shown).

The display unit 105 is provided on the acoustic piano 101 as shown in FIG. 1, and is located on the left side of the music rack 101*t*. The display unit 105 has a data processing system, an image producing screen and a touch panel overlapped with the image producing screen. The image producing screen may be implemented by a liquid crystal display panel. The image producing screen is three-dimensionally movable, and user can adjust the image producing screen to an arbitrary direction. Menus are step-wise shown on the touch panel, and user selects desired items on the touch panel. One of the menus prompts the user to select a mode of operation such as a playback mode, the acoustic sound mode, the silent mode and an ensemble mode. The display unit 105 further produces messages, instructions and a musical score for assisting the user.

The playback system 102 further comprises a servo-controller 102*a*, solenoid-operated key actuators 102*b* and a tone generator/sound system 102*c*. Though not shown in FIG. 2, plunger sensors are respectively provided in the solenoid-operated key actuators 102*b*, and plunger position signals are fed back to the servo-controller 102*a*. The plunger position signals are representative of actual plunger positions, and the servo-controller 102*a* controls the plunger motion through the feedback loop.

A set of music data codes is supplied from the information storage medium or a suitable data source through the MIDI interface port 110. When the information storage medium such as, for example, a compact disk is placed on a tray of the disk driver 106, the disk driver 106 reads out the set of music data codes from the compact disk, and transfers the set of music data codes to the working memory of the host controller 104. The set of music data codes are representative of pieces of music data information, and each piece of music data information includes at least note numbers indicative of the black/white keys to be moved, a key event, i.e., a note-on or a note-off, a key velocity to be imparted to the moved key and a time interval from the previous key event. The key velocity represents the loudness of a tone to be generated, because the loudness of the tone is proportional to the key velocity.

When the user instructs the playback mode to the host controller 104, the host controller 104 starts an internal timer, and searches the set of music data codes to see whether or not any piece of music data information is indicative of the present time. If the host controller 104 finds a piece of music data information indicative of the present time, the host controller 104 determines a target trajectory for the black/white key 101*f*/101*g* to be moved and a target key velocity Vr on the target trajectory. The host controller 104 instructs the servo-controller 102*a* to control the solenoid-operated key actuator 102*b* associated with the black/white key 101*f*/101*g* along the target trajectory with the control signal. The servo-controller 102*a* supplies a driving pulse signal to the solenoid-operated key actuator 102*b*. Then, the solenoid-operated key actuator 102*a* upwardly projects the plunger so as to move the associated black/white key 101*f*/101*g* without any fingering. While the plunger is projecting upwardly, the plunger sensor varies the plunger position signal, and the servo-controller 102*a* calculates an actual plunger velocity. The servo-controller 102*a* compares the actual plunger velocity with the target key velocity to see whether or not the plunger and, accordingly, the black/white key 101*f*/101*g* is moving along the target trajectory. If not, the servo-controller 102*a* varies the magnitude of the driving pulse signal for changing the plunger velocity. Thus, the black/white key 101*f*/101*g* is moved along the target trajectory identical with that in the original performance, and actuates the associated action mechanism 101*b* and the associated damper mechanism 101*d*. The damper head 101*s* is spaced from the music string 101*e*, and allows the music string 101*e* to vibrate. When the jack 101*n* is brought into contact with the regulating button 101*p*, the jack 101*n* escapes from the hammer 101*c*, and the hammer 101*c* is driven for rotation toward the music string 101*e*. The hammer 101*c* strikes the music string 101*e*, and rebounds thereon. The back check 101*r* gently receives the hammer 101*c*, and prevents the music string 101*e* from any double strike.

When the host controller 104 finds another piece of music data information representative of the note-off event at the present time, the host controller 104 determines a target key velocity on a target backward trajectory for the released key, and instructs the servo-controller to decrease the magnitude of the driving pulse signal with the control signal. The associated solenoid-operated key actuator 102*b* retracts the plunger, and guides the depressed black/white key 101*f*/101*g* toward the rest position. The servo-controller 102*a* also controls the plunger through the feedback loop. The damper head 101*s* is brought into contact with the music string 101*e*, and the acoustic piano tone is decayed.

When the user instructs the playback system 102 to generate the electronic tones, the host controller 104 sequentially supplies the music data codes to the tone generator 102*c*, and the tone generator 102*c* produces the analog audio signal from the music data codes. The tone generator 102*c* supplies the analog audio signal to the sound system 102*c*, and the sound system 102*c* generates the electronic tones instead of the acoustic piano tones. The host controller 104 may control an ensemble between the solenoid-operated key actuators 102*b* and the tone generator 102*c*.

In this instance, the playback system 102 further serves as a guide in the practice of fingering on the keyboard 101*a*. When the playback system 102 is requested to guide the trainee, the playback system 102 reads out a set of music data codes from the information storage medium, and gets ready for guiding the trainee. While the trainee is fingering on the keyboard 101*a*, the host controller 104 produces the musical score for the selected tune, and slightly moves the black/white keys 101*f*/101*g* by means of the solenoid-operated key actuators 101*b* immediately before the times to depress the black/white keys 101*f*/101*g*. Although the host controller 104 sequentially designates black/white keys 101*f*/101*g* to be depressed as similar to that in the playback mode, the servo-controller 102*a* stops the plungers before the associated jack 101*n* escapes from the hammer 101*c*. The playback system 102 does not allow the acoustic piano 101 to generate the acoustic piano tones. When the trainee further depresses the black/white keys 101*f*/101*g*, the jacks 101*n* are brought into contact with the regulating buttons 101*p*, and the hammers 101*c* are driven for rotation by the jacks 101*n*. The hammers 101*c* strike the associated music strings 101*e*, and the acoustic piano tones are generated from the music strings 101*e*. Thus, the playback system 102 gives the guide to the trainee.

The tone generator/sound system 102*c* is shared between the playback system 102 and the electronic sound generating system 103. The electronic sound generating system 103 further includes key sensors 103*a*. The key sensors 103*a* respectively monitor the black/white keys 101*f*/101*g*, and supply the key position signals to the host controller 104. The key position signal is representative of the current key position of the associated black/white key 101*f*/101*g*. The key sensor 103*a* is implemented by a shutter plate and photo-couplers. The shutter plate is attached to the back surface of the associated black/white key 101*f*/101*g*, and the photo-couplers are provided along the trajectory of the shutter plate at intervals. The photo-couplers radiate light beams across the trajectory of the shutter plate so that the shutter plate sequentially interrupts the light beams on the way to the end position.

While a pianist is playing a tune on the keyboard 101*a*, the host controller 104 starts an internal timer for the lapse of time from the initiation, and periodically checks the key position signals to see whether or not the pianist depresses or releases any one of the black/white keys 101*f*/101*g*. If the pianist depresses or releases the black/white keys 101*f*/101*g*, the associated key sensor 103*a* changes the key position signal representative of the current key position, and the host controller 104 is notified that the pianist depresses or releases the black/white keys 101*f*/101*g*.

When the host controller 104 finds the pianist to depress one of the black/white key 101*f*/101*g*, the host controller 104 specifies the note number assigned to the depressed black/white key 101*f*/101*g*, and determines the key velocity and the lapse of time from the previous key event. The host controller 104 stores the piece of music data information in the music data codes, and supplies the music data codes to the tone generator/sound system 102*c*. The tone generator/sound system 102*c* generates the electronic tone corresponding to the acoustic piano tone to be generated from the associated music string 101*e*.

Furthermore, when the host controller 104 finds the pianist to release the black/white key 101*f*/101*g*, the host controller 104 specifies the note number assigned to the released black/white key 101*f*/101*g*, and determines the key velocity and the lapse of time from the previous key event. The host controller 104 stores the piece of music data information in the music data codes, and supplies the music data codes to the tone generator/sound system 102*c*. The tone generator/sound system 102*c* decays the electronic tone. The electronic sound generating system 103 may supply the music data codes through the MIDI interface port 110 to another musical instrument.

The silent system 107 further comprises a hammer stopper 107*a* and an electric motor 107*b*, and the electric motor 107*b* is bi-directionally driven for rotation by the host controller 104. The host controller 104 changes the hammer stopper 107*a* from a free position FP to a blocking position BP and vice versa by means of the electric motor 107*b*. When a pianist wants to generate the acoustic piano tones in the acoustic sound mode, the host controller 104 changes the hammer stopper 107*a* to the free position FP. Then, the hammer stopper 107*a* is vacated from the trajectories of the hammers 101*c*, and the hammers 101*c* are allowed to strike the associated music strings 101*e*. On the other hand, when the pianist wants to play a tune without any acoustic piano tone in the silent mode, the host controller 104 changes the hammer stopper 107*a* to the blocking position BP. Even though the hammers 101*c* are driven for rotation through the escape, the hammers 101*c* rebound on the hammer stopper 107*a* before striking the music strings 101*e*, and any acoustic piano tone is not generated from the music string 101*e*. The electronic sound generating system 103 generates the electronic tones instead of the acoustic piano tones.

A trainee plays a tune together with the electronic sound generating system 103 in the ensemble mode. The trainee practices the fingering for the melody on the keyboard 101*a*, and the electronic sound generating system 103 generates the electronic tones for the accompaniment. Even if the trainee fingers out of the tempo, an electronic synchronizer according to the present invention makes the accompaniment synchronous with the fingering. When a pianist intentionally introduces a time lug between two tones, the electronic synchronizer also makes the accompaniment synchronous with the melody. In this instance, the host controller 104, the disk driver 106, the key sensors 103*a* and computer programs described hereinlater as a whole constitute the electronic synchronizer.

First, description is made on the music data codes used for the ensemble. The music data codes are formatted in accordance with the MIDI (Musical Instrument Digital Interface) standards.

Multi-track Music Data Codes and Data Organization

FIG. 3 shows the music data codes formatted in the MIDI standards. Pieces of music data information stored in the music data codes are broken down into event data, timing data and control data. A kind of key event such as the note-on event or the note-off even, the note number and a velocity are memorized in a piece of event data, and the time interval between an event and the previous event is stored in a piece of timing data. The key velocity is corresponding to the velocity. The control data “END” is representative of a message that the performance is to be terminated. The user can assign sixteen tracks Tr0 to Tr15 to difference instruments at the maximum according to the MIDI standards. For this reason, pieces of event data, associated pieces of timing data and the control data “END” form a piece of sequence data for one of the tracks Tr0 to Tr15.

The piece of sequence data Tr0 contains pieces of event data ET1/ET2 and pieces of timing data associated with the pieces of event data ET1/ET2. The piece of event data ET1 has storage areas assigned to the note-on event, the note number and the velocity. According to the present invention, a cue flag Cf is storable in the storage area assigned to the velocity. The cue flag Cf is indicative of the mark point at which the electronic tone generating system 103 is to be synchronized with the acoustic piano 101.

In this instance, the principal melody line in a tune is performed by a pianist on the acoustic piano 101, and one of the tracks Tr0 is assigned to a piece of sequential data representative of the principal melody line. The cue flags Cf are stored in the pieces of event data of the piece of sequential data at intervals. Another piece of sequential data is assigned to the accompaniment of the same tune, and is assigned other track or tracks. In this instance, the piece of sequential data for the accompaniment is assigned the track Tr1. The track Tr0 and the other track Tr1 are hereinbelow referred to as “principal melody track” and “accompaniment track”, respectively. The pieces of timing data keep the pieces of event data in the principal melody track Tr0 and the pieces of event data in the accompaniment track Tr1 correlative with one another. For this reason, the accompaniment is synchronized with the principal melody.

While a trainee is playing the principal melody on the keyboard 101*a*, the host controller 104 reads of the piece of sequential data from the track Tr0, and checks the key position signals to see whether or not the pianist depresses the black/white key 101/101*g* represented by the note number marked with the cue flag Cf. If the trainee fingers out of the tempo, the host controller 104 retards or advances the data processing on the piece of event data marked with the cue flag Cf, and the associated pieces of timing data in the principal melody track Tr0 and the accompaniment track Tr1 make the data processing on the corresponding piece of event data in the accompaniment track Tr1 synchronous with that in the principal melody track Tr0. Thus, the cue flag Cf is written in any music data code representative of a piece of event data, and the electronic synchronizer according to the present invention makes the accompaniment synchronous with the principal melody at the note marked with the cue flag Cf.

Assistance in Ensemble Mode

Figure 5:
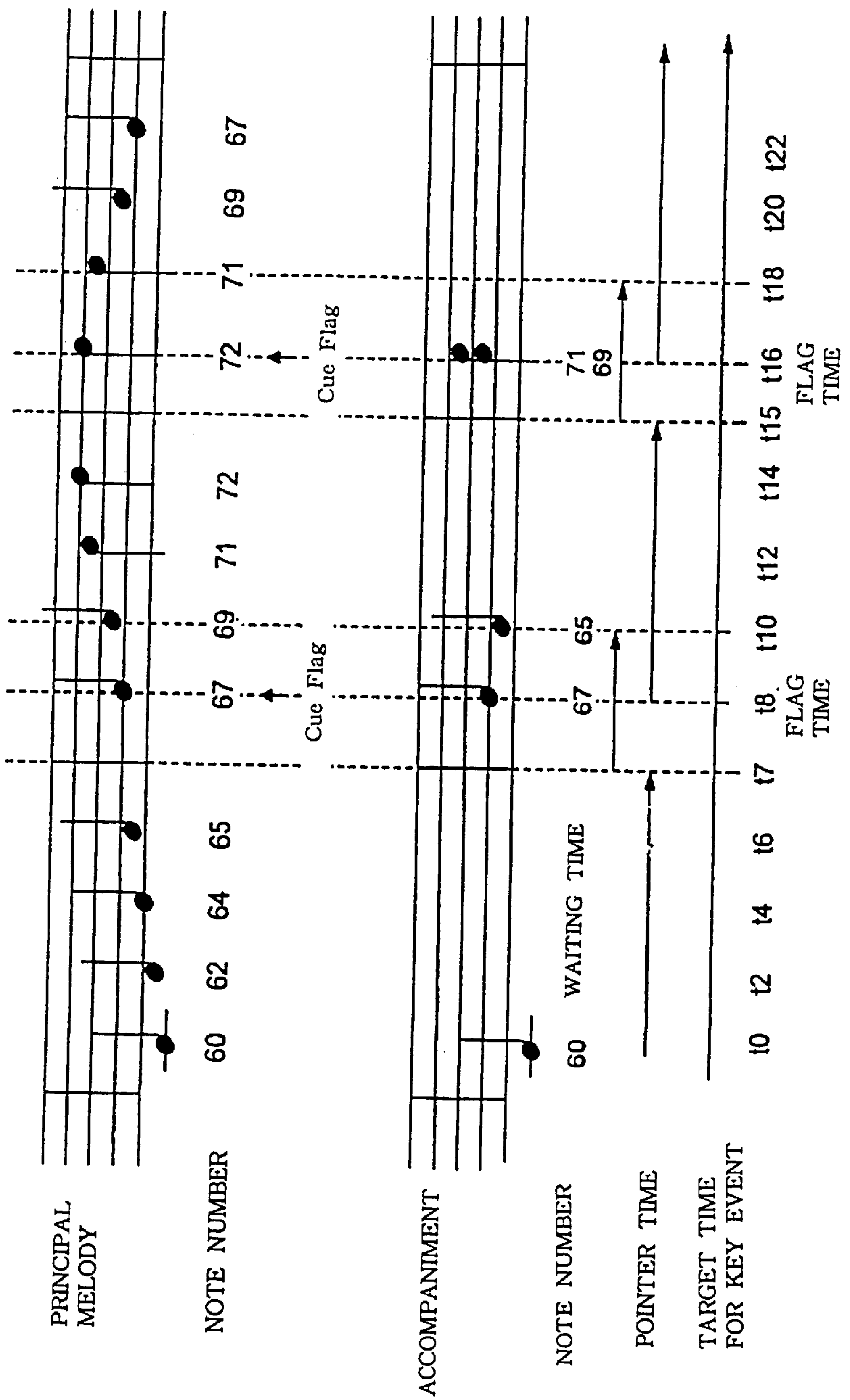
FIG. 5 is a view showing a musical score for an ensemble.

A set of music data codes represents a music score, a part of which is shown in FIG. 5. The set of music data codes is stored in the information storage medium. The set of music data codes is broken down into a piece of sequence data representative of a principal melody and another piece of sequence data representative of the accompaniment. The music data codes for the principal melody are assigned the principal melody track Tr0, and the music data codes for the accompaniment are assigned the accompaniment track Tr1.

A “target time for key event” is equal to the accumulation of pieces of timing data until the associated piece of event data, and is representative of a time at which the associated event such as the note-on event or note-off event is to take place. If the controller achieves the resolution twice as long as a quaver note, the note-on events for the first to fifth quarter notes occur at t0, t2, t4, t6 and t8. The cue flags Cf are added to the note numbers “67” and “72” indicated by the fifth quarter note and the ninth quarter note, respectively. The ninth quarter note has the note-on event at t16. The target time for key event is shared between all the tracks Tr0 to Tr15, and the host controller 104 synchronizes the data processing on the music data codes in the principal melody track Tr0 with the data processing on the music data codes for the accompaniment track Tr1. The cue note Cf is assumed to be stored in a MIDI music data code for a certain note. The note-on event for the certain note occurs at a “flag time”. In other words, the flag time is equivalent to the target time for key event at which the certain note is to be synchronized with the associated note for the accompaniment. A “flag event” is a detection of the depressed key 101*f*/101*g* corresponding to the note marked with the cue flag Cf.

Read-out timers are provided for the tracks, respectively, and each of the read-out timers stores a read-out time. The read-out time is equivalent to a time period until read-out of a piece of event data, and is stepwise decremented by the host controller 104. Namely, when the read-out time reaches zero, the associated piece of event data is read out for the data processing. The read-out time is earlier than the target time by a predetermined time interval. For this reason, the associated piece of event data is read out before the target time.

A "pointer time" is a time stored in the internal clock. The internal clock is incremented at regular time intervals by a clock signal representative of a tempo. According to the present invention, selected notes in the principal melody are accompanied with the cue flags Cf for synchronizing the principal melody with the fingering on the keyboard 101*a*. The synchronization is achieved by temporarily stopping the internal clock. For this reason, it is not necessary to increment the pointer time at regular time intervals.

Term "waiting time" means a lapse of time after entry into waiting status. When the read-out timer for the principal melody track Tr0 reaches zero, the associated piece of event data containing the cue flag Cf enters the waiting status, and the waiting status continues for a predetermined time period. The piece of event data marked with the cue flag Cf exits from the waiting status when the trainee depresses the black/white key 101*f*/101*g* within the predetermined time period. Similarly, if the predetermined time period is expired without depressing the black/white key, the piece of event data also exits from the waiting status. The pointer time is not incremented in the waiting status. When the flag event takes place, the internal clock is set for the flag time, and restarts to increment the pointer time. On the other hand, when the predetermined time period is expired without flag event, the internal clock is set for the event time of the non-executed event data. Thus, the internal clock is periodically regulated at the marked notes in the principal melody, and the data transfer to the tone generator/sound system 102*c* is also periodically regulated, because the event time is shared between all the tracks.

Figure 6:
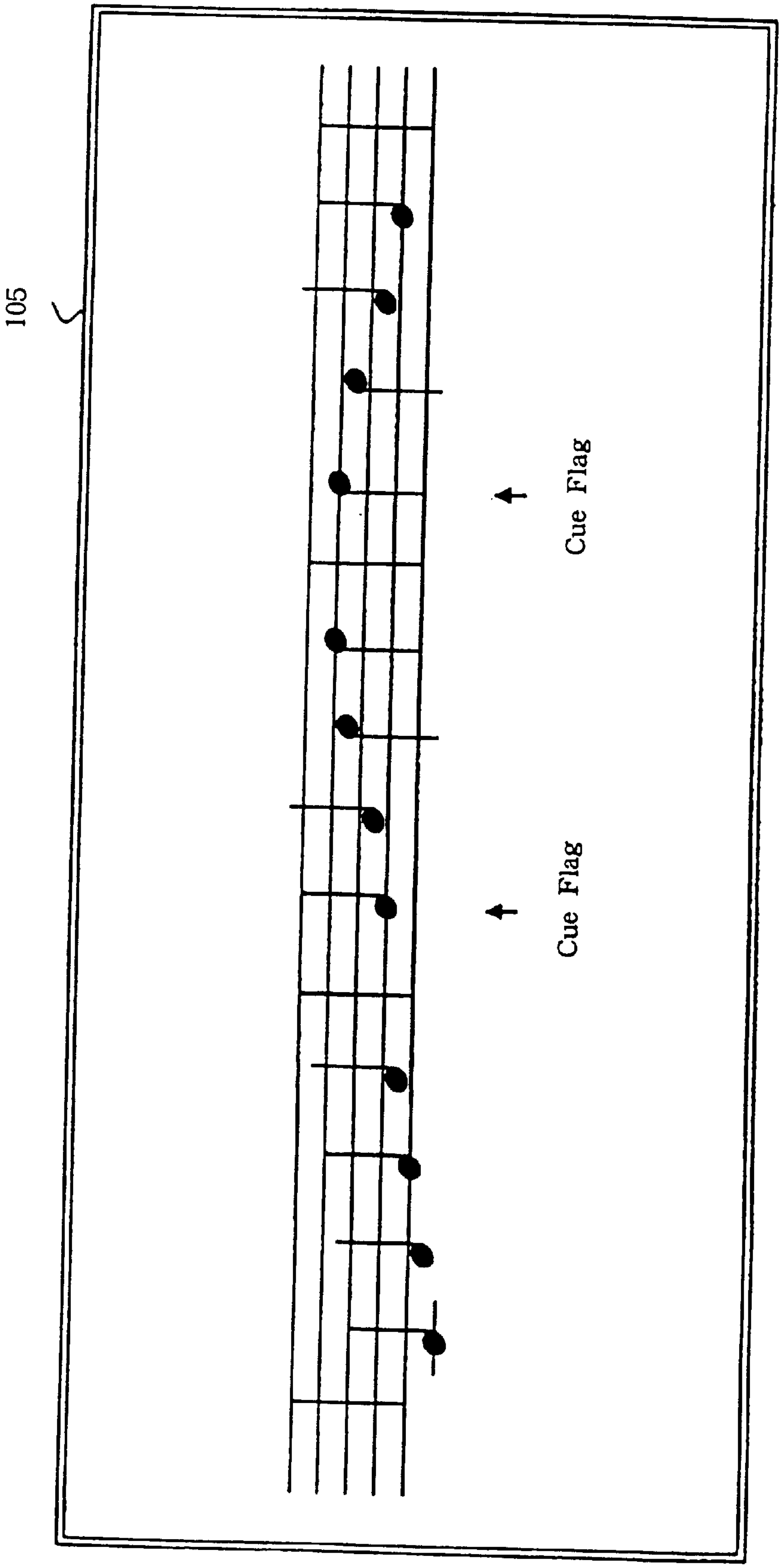
FIG. 6 is a front view showing a part of the music score produced on a display unit.

As described hereinbefore, the host controller 104 produces the musical score for a tune on the display unit 105, and guides the trainee in fingering. FIG. 6 shows the musical score produced on the display unit 105. Only the musical score of the principal melody is produced on the display unit 105, because the host controller 104 guides the trainee in the fingering for the principal melody. The host controller 104 produces several measures of the musical score, and scrolls the musical score in synchronism with the fingering on the keyboard 101*a*. The quarter notes at the synchronous points are marked with arrows and words "Cue Flag". The arrow and the words notify a series of notes to be sequentially performed to the trainee. The host controller 104 blinks the arrow and the words at the next synchronous point so as to draw the trainee's attention thereto.

The host controller 104 assigns particular storage areas of the working memory to a depressed key buffer, an event buffer and a cue flag buffer. FIGS. 7A to 7C show the depressed key buffer, the event buffer and the cue flag buffer, respectively.

The depressed key buffer stores the note number assigned to the latest depressed key 101*f*/101*g*. The host controller 104 has a table between black/white keys 101*f*/101*g* and the note numbers assigned thereto. When the host controller 104 finds the trainee to depress the black/white key 101*f*/101*g* on the basis of the variation of current key position, the host controller 104 checks the table to see what note number is assigned to the depressed key 101*f*/101*g*. The host controller 104 identifies the note number assigned to the depressed key 101*f*/101*g*, and writes the note number of the depressed key into the depressed key buffer. In other words, the host controller 104 maintains the note number of the black/white key 101*f*/101*g* just depressed by the trainee in the depressed key buffer. The depressed key buffer shown in FIG. 7A teaches that the trainee has just depressed the black/white key assigned the note number "65".

The event buffer stores pieces of event data to be processed. The pieces of event data to be processed are grouped by the track, and the kind of event, the note number and the target time are stored together with the track number. The event buffer shown in FIG. 7B indicates that a music data code for the note-on event of the tone identified with the note number 67 is to be processed at the target time t8 for actuating the associated solenoid-operated key actuator 102*b* and that the music data code for the note-on event at the note number 67 is to be transferred at target time t8 to the tone generator/sound system 102*c*.

The cue flag buffer teaches the target time at which the music data code marked with the cue flag Cf is to be processed and a lapse of time from the registration therein.

Computer Programs

Figure 8:
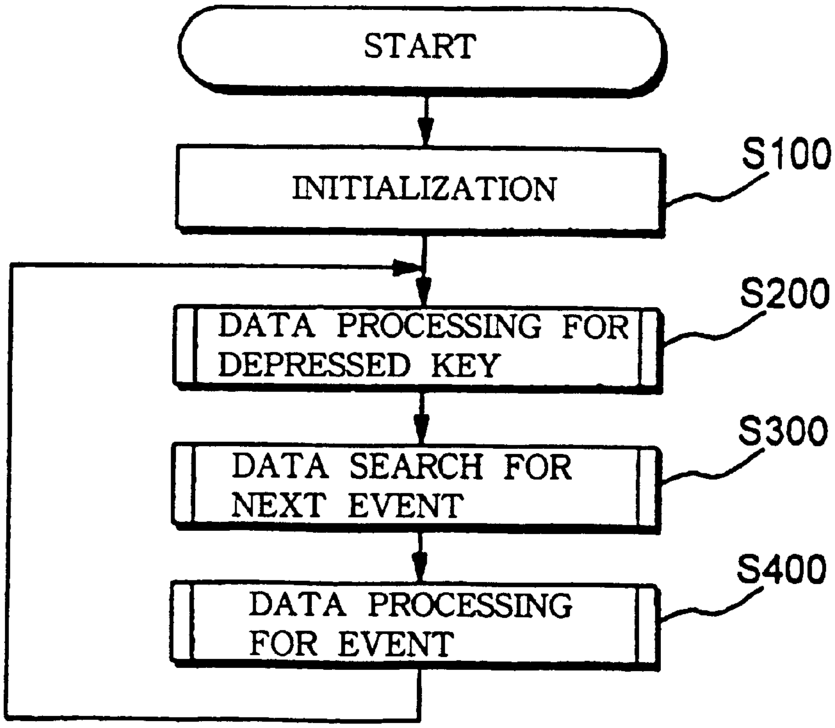
FIG. 8 is a view showing a main routine program executed by a host controller in an ensemble mode.

The host controller 104 processes the music data codes in the ensemble mode as follows. FIG. 8 illustrates a main routine program for the host controller 104.

When the host controller 104 is energized, the host controller 104 starts the main routine program. The host controller 104 firstly initializes the buffers and the internal clock as by step S100. After the initialization, the host controller 104 waits for user's instruction. When the user instructs the ensemble mode through the display unit 105 to the host controller 104, the host controller 104 reiterates the loop consisting of sub-routine programs S200, S300 and S400 until termination of the ensemble. The host controller 104 carries out a data processing for a depressed key through the sub-routine program S200, and a data search for next event and a data processing for the event are carried out through the sub-routine programs S300 and S400, respectively. The host controller 104 circulates through the loop within unit time. The unit time is long enough to permit all the events concurrently scheduled to occur.

Figure 9:
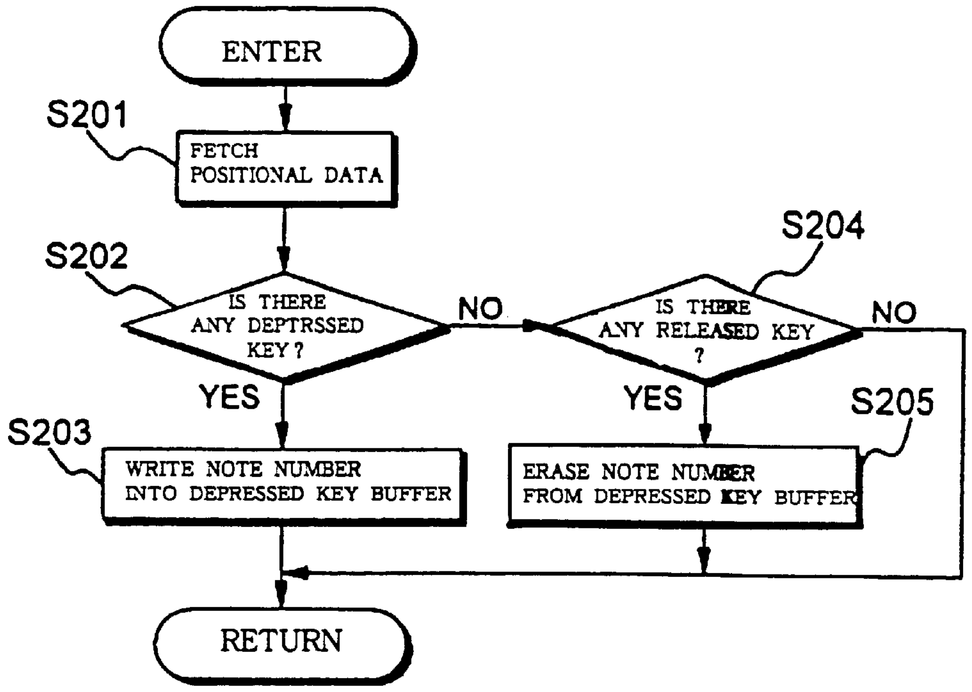
FIG. 9 is a view showing a subroutine program forming a part of the main routine program.

The host controller 104 achieves tasks shown in FIG. 9 through the subroutine program S200. When the main routine program branches into the subroutine program S200, the host controller 104 fetches the pieces of positional data information represented by the key position signals from the interface assigned to the key sensors 103*a* as by step S201, and stores the pieces of positional data information in the working memory. The host controller 104 checks the pieces of positional data information to see whether or not any one of the black/white keys 101*f*/101*g* is depressed by the trainee as by step S202. When the host controller 104 finds the trainee to depress the black/white key 101*f*/101*g*, the answer at step S202 is given affirmative, and the host controller 104 writes the note number assigned to the depressed key into the depressed key buffer as by step S203. On the other hand, if the host controller 104 does not find any depressed key, the host controller 104 proceeds to step S204, and checks the pieces of positional data information to see whether or not the trainee released the depressed key. When the host controller 104 finds that the trainee releases the depressed key, the host controller 104 erases the note number from the depressed key buffer as by step S205. Upon completion of the data processing at step S203 or S205, the host controller 104 returns to the main routine program. Thus, the host controller 104 periodically checks the key position signals for a depressed/released key 101*f*/101*g*, and stores the note number assigned to the latest depressed key in the depressed key buffer.

Figure 10:
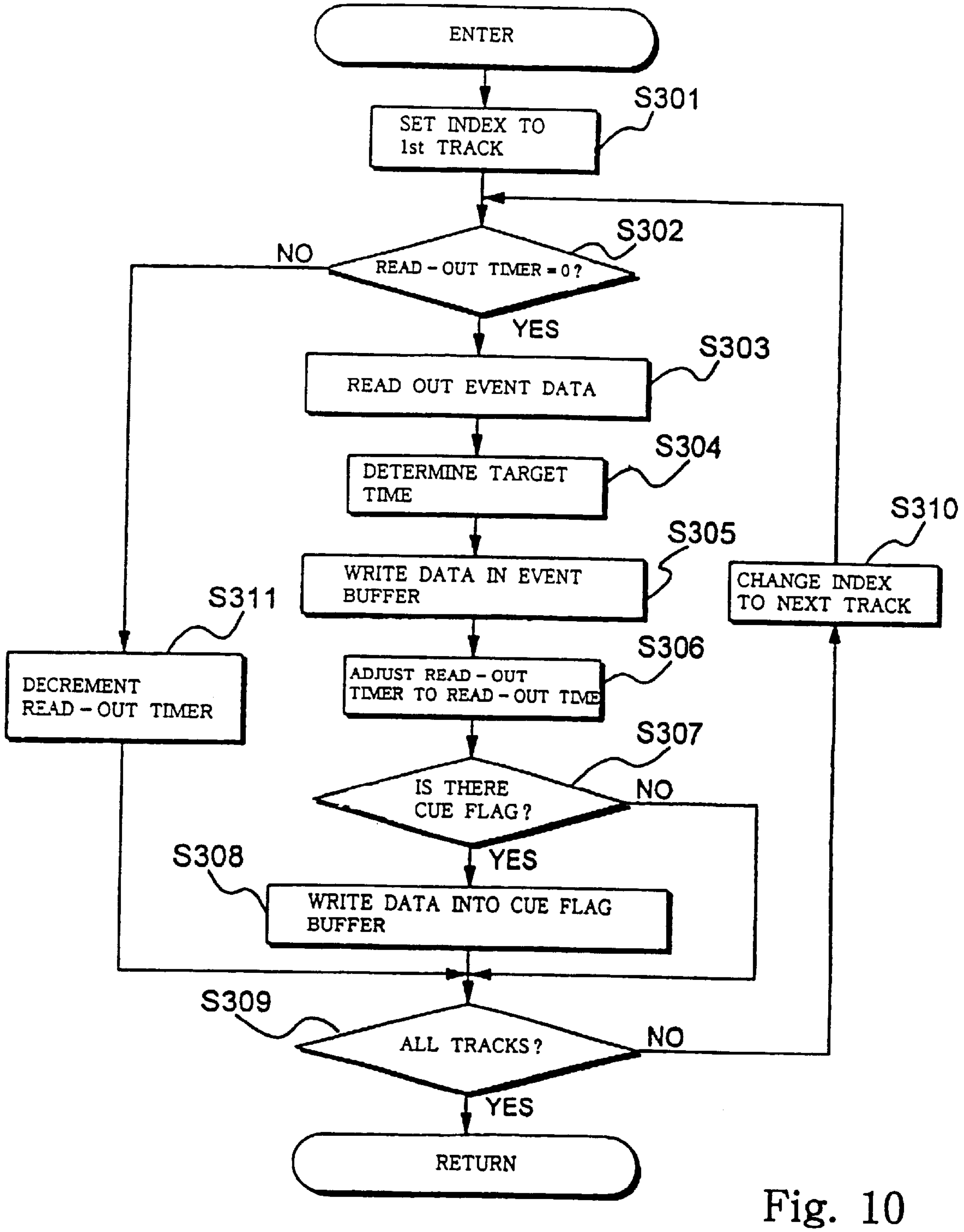
FIG. 10 is a view showing a subroutine program forming another part of the main routine program.

In the sub-routine program S300, the host controller 104 achieves tasks shown in FIG. 10. The host controller 104 writes the pieces of event data to be processed and the target time in the event buffer through the sub-routine program S300. First, the host controller 104 sets an index to the first track Tr0 as by step S301. The host controller 104 checks the read-out timer associated with the selected track to see whether or not the read-out time reaches zero as by step S302. Any read-out time has not been stored in the read-out timer immediately after the initiation of the ensemble, and the answer at step S302 is given affirmative. If the read-out timer was set, the read-out time has been decremented in each execution of the sub-routine program S300. Finally, the read-out timer indicates that the read-out time is zero, and the answer at step S302 is given affirmative. The read-out time is earlier than the target time by a predetermined time. Then, the host controller 104 proceeds to step S303, and reads out the first piece of event data. Subsequently, the host controller 104 determines the target time on the basis of the associated piece of timing data as by step S304, and writes the kind of event, the note number and the target time in the row of the event buffer assigned to the given track as by step S305. The host controller 104 determines the read-out time earlier than the target time by the predetermined time period, and adjusts the read-out timer to the read-out time as by step S306. The host controller 104 checks the piece of event data to see whether or not the cue flag Cf is stored in the piece of event data as by step S307. If the cue flag Cf is found, the answer at step S307 is given affirmative, and the host controller 104 writes the note number, the flag time and the waiting time into the cue flag buffer (see FIG. 7C) as by step S308. When the host controller 104 writes them into the cur flag buffer, the waiting time is zero. The piece of event data enters into the waiting status. The host controller 104 proceeds to step S309. When the piece of event data does not contain the cue flag Cf, the answer at step S307 is given negative, and the host controller 104 checks the index to see whether or not pieces of event data are written into the event buffer for all the tracks as by step S309. If the answer at step S309 is given negative, the host controller 104 increments the index as by step S310, and returns to step S302.

If the host controller 104 adjusted the read-out timer to the read-out time in the previous execution, the answer at step S302 is given negative, and the host controller 104 proceeds to step S311. The host controller 104 decrements the read-out time at step S311, and proceeds to step S309 without execution of steps S303 to S308. The host controller 104 reiterates the loop consisting of steps 302 to 310 until the index indicates the last track. Upon completion of the data search for the pieces of event data, the host controller 104 returns to the main routine program.

Figure 11:
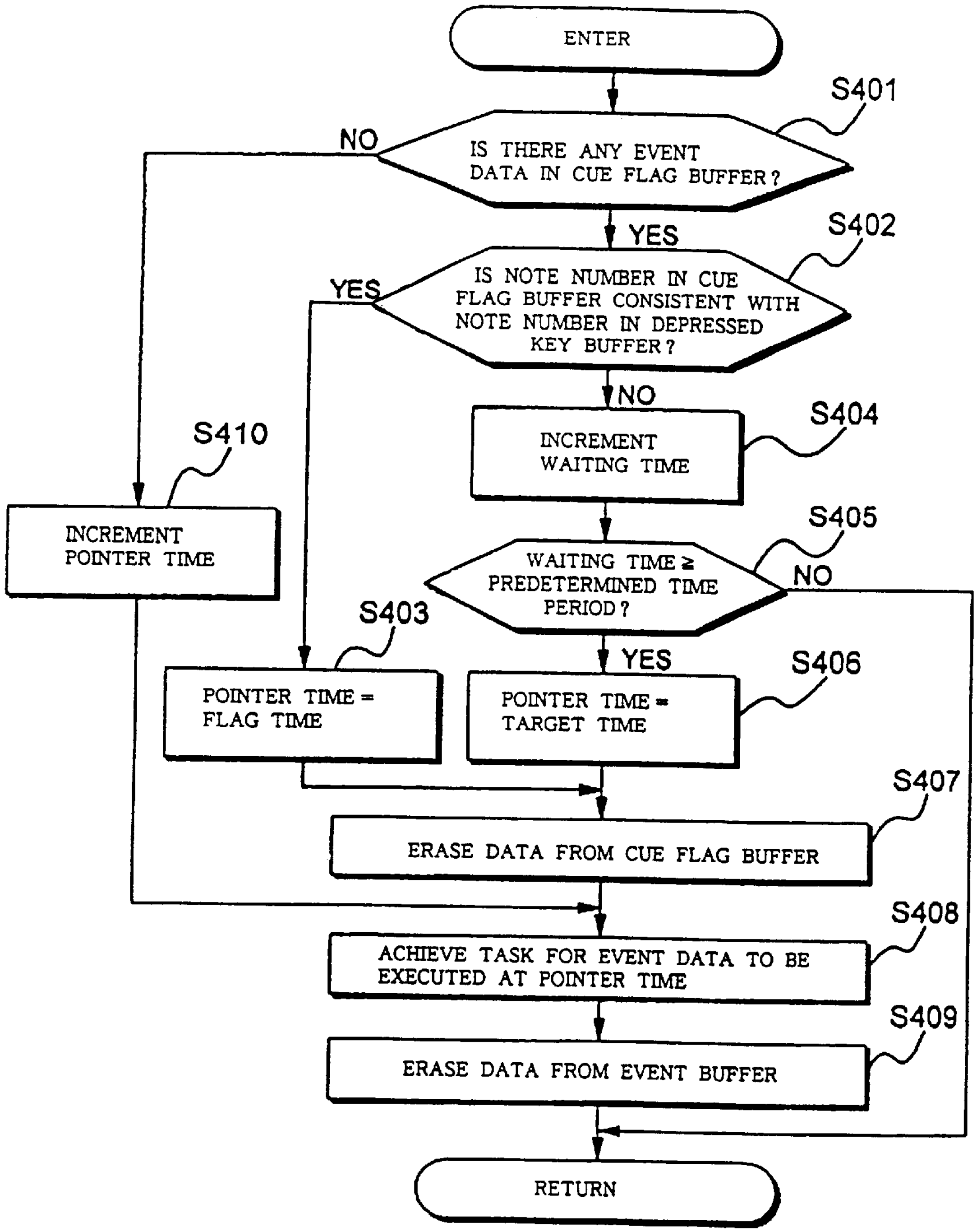
FIG. 11 is a view showing a subroutine program forming yet another part of the main routine program.

The sub-routine program S400 is carried out for tasks shown in FIG. 11. The host controller 104 synchronizes the electronic sound generating system 103 with the fingering on the keyboard 101*a* through the sub-routine program S400. When the main routine program branches to the sub-routine program S400, the host controller 104 checks the cue flag buffer to see whether or not any piece of event data has been already written therein as by step S401. If the host controller 104 has not written any piece of event data in the cue flag buffer, the answer at step S402 is given negative, and the host controller 104 proceeds to step S410. The host controller 104 increments the pointer time at step S410.

On the other hand, when the host controller 104 finds a piece of event data in the cue flag buffer, the answer at step S401 is given affirmative, and the host controller 104 proceeds to step S402. The host controller 104 compares the note number stored in the cue flag buffer with the note number stored in the depressed key buffer to see whether or not they are consistent with each other at step S402. As described hereinbefore, when a piece of event data has written into the cue flag buffer, the piece of event data entered the waiting status.

On the other hand, when the black/white key 101*f*/101*g* was depressed, the note number assigned to the depressed key has been written into the depressed key buffer. Therefore, if the note number in the cue flag buffer is consistent with the note number in the depressed key buffer, the trainee timely depresses the black/white key at the marked note in the principal melody within the predetermined time period. Then, the piece of event data exits from the waiting status, and the host controller 104 adjusts the pointer time to the flag time as by step S403.

On the other hand, if the trainee have not depressed the black/white key 101*f*/101*g* at the marked note, yet, the note number stored in the depressed key buffer is different from the note number stored in the cue flag buffer, and the answer at step S402 is given negative. Then, the host controller 104 increments the waiting time stored in the cue flag buffer.

Subsequently, the host controller 104 checks the cue flag buffer to see whether or not the waiting time is equal to or greater than the predetermined time period as by step S405. Even if the trainee have not depressed the black/white key 101*f*/101*g* at the marked note in the principal melody, the delay is admittable in so far as the waiting time is shorter than the predetermined time period. Then, the host controller 104 immediately returns to the main routine program.

On the other hand, if the predetermined time period has been expired, the answer at step S405 is given affirmative, and the host controller 104 assumes that the trainee skips the note at the marked point in the principal melody either intentionally or unintentionally. Then, the host controller 104 adjusts the pointer time to the target time for the missing key 101*f*/101*g* as by step S406.

Upon completion of the adjustment at step S403 or S406, the host controller 104 erases the note number and the flag time from the cue flag buffer, and the waiting time is reset to zero as by step S407. Subsequently, the host controller 104 checks the event buffer to see whether or not the pointer time is equal to any one of the target times stored in the event buffer. If the host controller 104 finds the target time or times equal to the pointer time, the host controller 104 achieves the task or tasks for the piece or pieces of event data as by step S408. In detail, if the piece of event data is found in the principal melody track, the host controller 104 instructs the servo-controller 102*a* to drive the solenoid-operated key actuator 102*b* for the guide. If the piece of event data in the track Tr1 has the target time equal to the pointer time, the host, the host controller 104 transfers the music data code to the tone generator/sound system 102*c*, scrolls the part of the score, and transfers the music data codes to the tone generator/sound system 102*c* for generating the electronic tone for the accompaniment. The host controller 104 scrolls the score in such a manner as to produce a note at the pointer time at the center of the screen. Otherwise, the part of the score may be intermittently scrolled by a single measure. When the note marked with the cue flag Cf is produced, the host controller 104 produces the image "cue flag" under the note. When the next note marked with the cue flag Cf is produced on the screen, the host controller 104 blinks the next note. Even if plural notes marked with the cue flags Cf are concurrently produced on the screen, the trainee easily discriminates the next note marked with the cue flag Cf. Thereafter, the host controller 104 erases the kind of event, the note number and the target time associated with the piece of event data executed at S408 from the event buffer as by step S409. After step S409, the host controller returns to the main routine program.

As described in the previous paragraph, the pieces of event data in the track Tr1 are sequentially transferred to the electronic sound generating system 102*c* through the subroutine program S400 (see step S408). The host controller 104 makes the data processing on the pieces of event data in the tracks Tr0 and Tr1 synchronous with the fingering at the notes marked with the cue flag Cf. The user can store the cue flag Cf in any piece of event data. Of course, the user can store the cue flag Cf in the piece of event data representative of the note intentionally delayed or advanced. For this reason, the electronic synchronizer according to the present invention achieves good ensemble between the fingering and the electronic sound generating system 103.

In the above-described embodiment, the host controller 104 and the tone generator/sound system 102*c* serves as the first musical instrument, and the action mechanisms 101*b*, the hammers 101*c* and the music strings 101*e* as a whole constitute the second musical instrument. The disk driver 106 and the information storage medium such as, for example, the compact disk as a whole constitute the first data source, and the keyboard 101*a* and the key sensors 103*a* form in combination the second data source. The host controller 104 and the subroutine programs S200, S300 and S400 as a whole constitute the controller.

As will be appreciated from the foregoing description, the cue flag Cf is storeable in any piece of event data, and the electronic synchronizer according to the present invention achieves the synchronization between two parts of a piece of music such as, for example, the principal melody and the accompaniment at any notes marked with the cue flags.

Moreover, the host controller 104 cooperates with the display unit 105 so as to notify the progression of the piece of music to the pianist. The pianist recognizes his week point through the display unit 105, and improves the skill.

Although particular embodiments of the present invention have been shown and described, it will be apparent to those skilled in the art that various changes and modifications may be made without departing from the spirit and scope of the present invention.

For example, the cue flag Cf may be stored in a storage area different from the storage area assigned to the velocity.

The electronic synchronizer according to the present invention may synchronize more than two parts of a piece of music through more than two musical instrument. The trainee may perform another part of the piece of music.

The playback system 102 does not give any guide to the trainee in the ensemble mode. Otherwise, another keyboard musical instrument may have an electric tutor independent of the playback system 102. In this instance, the electric tutor may guide a trainee in the fingering by sequentially illuminating the black/white keys 101*f*/101*g* to be depressed.

The electronic synchronizer may be provided in association with another kind of musical instrument such as, for example, a stringed instrument or a wind instrument. The keyboard musical instrument is never limited to the acoustic piano. An organ and an electric keyboard are categorized in the keyboard musical instrument. While a player is performing a part of a music score on the stringed/wind instrument, another part is played by an electronic sound generating system, and the electronic synchronizer makes the electronic sound generating system synchronous with the performance.

Figure 12:
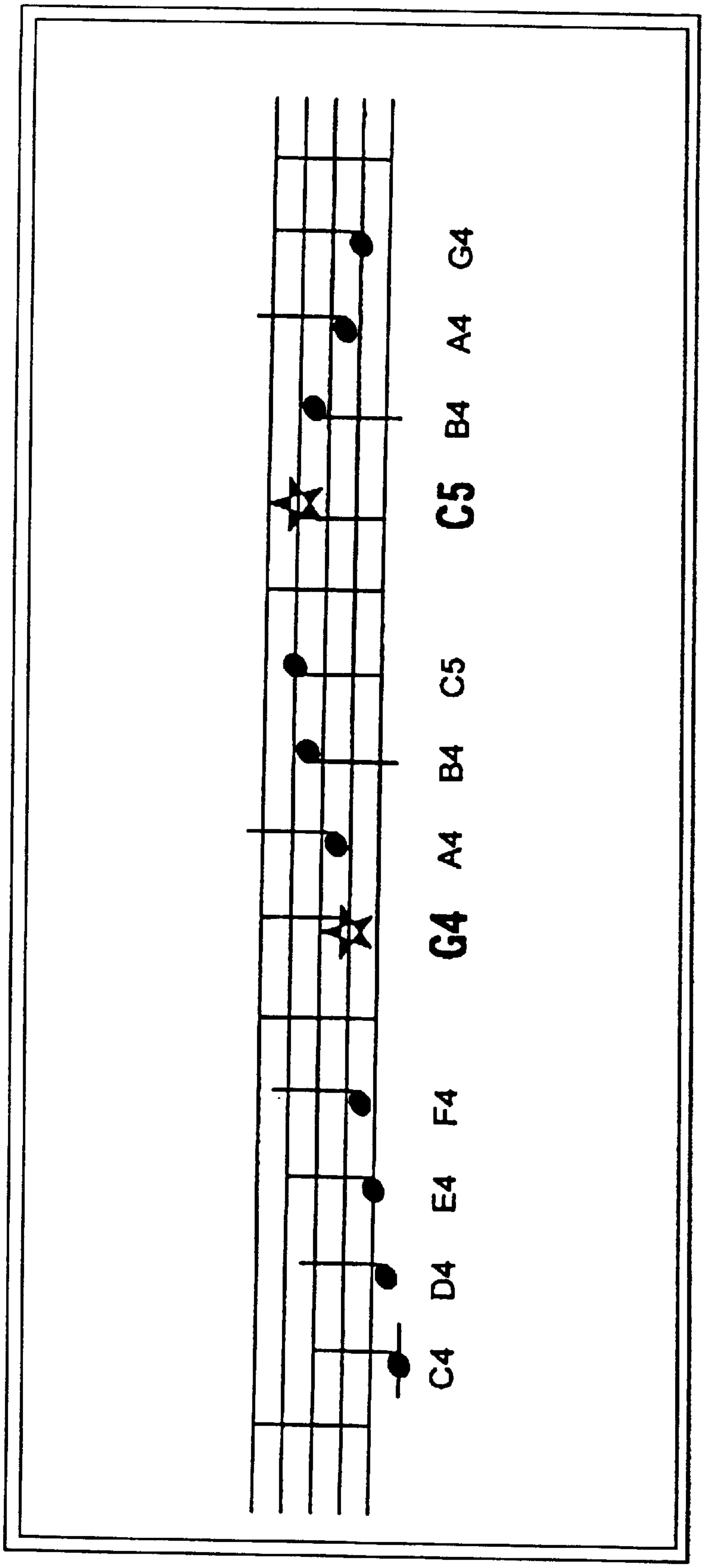
FIG. 12 is a front view showing a part of a score produced in a display unit incorporated in another keyboard musical instrument according to the present invention.

Another musical instrument according to the present invention may emphasize notes G4 and CS marked with the cue flags by enlarging the alphabetical letters and stars as shown in FIG. 12. The score is also scrolled together with the progression of the performance. Notes marked with the cue flags may be emphasized by using different color, blinking or reverse images.

Another keyboard musical instrument according to the present invention may guide a trainee in fingering by vibrating a key or keys to be depressed.

Another electronic synchronizer may draw the attention to a note marked with the cue flag not depressed within the predetermined time period. In order to draw the attention, the electronic synchronizer may shortly blink the note or change the note to different color.

In the above-described embodiment, the electronic sound generating system 103 generates the electronic tones for the accompaniment. The trainee and the electronic sound generating system 103 may exchange the parts of a score. In this instance, the electronic sound generating system 103 generates the electronic tones for a principal melody so that the trainee practices the chords along the principal melody.

Another electronic synchronizer may be associated with a musical instrument for producing a tune and a sound effect system or with the musical instrument and a percussion instrument. Yet another electronic synchronizer may synchronize a musical instrument with another musical instrument through a MIDI interface port.

The data codes may be formatted in any kind of standards such as, for example, MPEG (Moving Picture Experts Group) standards and ADPCM (Adaptive Differential Pulse Code Modulation) standards.

The key sensors may be replaced with another sensor array such as, for example, an array of hammer sensors. An array of sensor may monitor the damper mechanisms 101*d*. In the above-described embodiment, the key sensor 103*a* is of the type converting light to electric current. Another kind of sensor such as, for example, a magnetoelectric converter, an opto-magnetoelectric converter or an optomagnetic converter is used for detecting the fingering.

The synchronous points may be represented by another kind of control data such as, for example, pieces of control data information representative of bars in a score or pieces of control data information representative of rests in a score. Otherwise, an electronic synchronizer according to the present invention counts the notes, and makes the musical instrument and another kind of instrument synchronous with the fingering at intervals of a predetermined number of notes.

Another electronic synchronizer may change the tempo. When the waiting time is short, the electronic synchronizer increases the tempo until the next note marked with the cue flag. On the other hand, if the waiting time is long, the electronic synchronizer decreases the tempo until the next note marked with the cue flag.

In the above-described embodiment, the pointer time is temporarily stopped until the flag event. Another electronic synchronizer may retard or advance the progression of the accompaniment for synchronizing it with the fingering.

In the above-described embodiment, both of the principal melody track and the accompaniment track are stopped by using the pointer time. Another electronic synchronizer may firstly stop the data read-out from the principal melody track and, thereafter, the data read-out from the accompaniment track. Other wise, the electronic synchronizer may retard the accompaniment.

In the above-described embodiment, when the predetermined time period is expired, the data read-out restarts from both tracks. Another electronic synchronizer may wait for the depressed key after expiry of the predetermined time period.

In the above-described embodiment, if the trainee depresses the key assigned the note marked with the cue flag before the target time, both of the principal melody and the accompaniment are moved forward. Another electronic synchronizer may move only the principal melody forward. In this instance, if the electronic synchronizer detects the depressed key within a time period after the pointer time reaches the target time, the pointer time is incremented without the temporarily stop. However, if the electronic synchronizer does not detect the depressed key, the electronic synchronizer waits for the depressed key after expiry of the predetermined time period.

The computer program may be installed in the host controller from a handy information storage medium or supplied thereto through a communication line.

What is claimed is:

1. A synchronizer for synchronizing a first musical instrument with a second musical instrument, comprising:

a first data source storing a first piece of sequence data including a first series of pieces of music data used for producing first tones for a part of a score and pieces of synchronous data selectively associated with the pieces of music data of said first series and a second piece of sequence data including a second series of pieces of music data used for producing tones for another part of said score, and synchronously outputting said first piece of sequence data and said second piece of sequence data;

a second data source successively outputting pieces of reference data representative of an actual performance on said second musical instrument for producing said first tones; and a controller connected to said first data source, said second data source and said first musical instrument, comparing said pieces of synchronous data with certain pieces of reference data corresponding to the pieces of music data associated with said pieces of synchronous data to see whether or not said second data source timely outputs said certain pieces of reference data, and controlling a data transfer of said second series of pieces of music data to said first musical instrument so as to make said another part synchronous with said actual performance.

2. The synchronizer as set forth in claim 1, in which said pieces of reference data are associated with said pieces of music data of said first series arbitrary selected before said performance.

3. The synchronizer as set forth in claim 2, in which said part of said score and said another part of said score are representative of a principal melody of a piece of music and an accompaniment of said piece of music, respectively.

4. The synchronizer as set forth in claim 2, in which said controller defines a time period containing a target time at which each of said certain pieces of reference data is to arrive at said controller for the comparison with associated one of said pieces of music data associated with the pieces of synchronous data, and said controller changes said data transfer from said target time to an arrival time of said each of said certain pieces of reference data if said arrival time is fallen within said time period.

5. The synchronizer as set forth in claim 4, in which said controller changes said data transfer from said target time to an expiry of said time period if said time period is expired without the arrival of said each of said certain pieces of reference data.

6. The synchronizer as set forth in claim 1, further comprising an information provider for providing a piece of information representative of progression of said performance.

7. The synchronizer as set forth in claim 6, in which said piece of information includes a first sub-piece of information representative of a note of said part presently performed and a second sub-piece of information representative of another note corresponding to the next piece of music data associated with the piece of synchronous data.

8. The synchronizer as set forth in claim 7, in which said first sub-piece of information and said second sub-piece of information are given in the form of images of said note and said another note on a music paper.

9. The synchronizer as set forth in claim 8, in which said images are moved in synchronism with said performance.

10. The synchronizer as set forth in claim 9, in which said images are produced on a screen of a display panel.

11. The synchronizer as set forth in claim 8, in which the image representative of said another note is accompanied with another image representative of said piece of synchronous data.

12. The synchronizer as set forth in claim 11, in which said another image is given in the form of at least one word.

13. The synchronizer as set forth in claim 1, further comprising an information provider for providing a piece of information representative of progression of said performance, and in which said pieces of reference data are associated with said pieces of music data of said first series arbitrarily selected before said performance.

14. The synchronizer as set forth in claim 13, in which said pieces of reference data are indicative of keys selectively depressed by a player and incorporated in said second musical instrument.

15. The synchronizer as set forth in claim 14, in which said controller stores a note number assigned to one of said keys just depressed in a depressed key buffer as one of said certain pieces of reference data, a note number assigned to one of said keys to be depressed in a flag buffer as one of said pieces of music data associated with said pieces of synchronous data and one of said pieces of music data of said second series associated with said one of said pieces of music data of said first series in an event buffer, and compares said note number stored in said depressed key buffer with said note number stored in said flag buffer to see whether or not said second data source timely outputs said one of said certain pieces of reference data.

16. The synchronizer as set forth in claim 15, in which said controller defines a time period containing a target time at which said one of said certain pieces of reference data is to arrive, and determines that said second data source timely outputs said one of said certain pieces of reference data in so far as said one of said certain pieces of reference data arrives at said controller within said time period.

17. The synchronizer as set forth in claim 16, in which said controller changes said data transfer from said target time to an arrival time of said one of said certain pieces of reference data if said arrival time is fallen within said time period.

18. The synchronizer as set forth in claim 17, in which said controller changes said data transfer from said target time to an expiry of said time period if said time period is expired without the arrival of said each of said certain pieces of reference data.

19. The synchronizer as set forth in claim 1, in which said second musical instrument is an acoustic piano for producing said first tones of a principal melody, and said first musical instrument is an electronic sound generating system for producing said second tones of an accompaniment.

20. The synchronizer as set forth in claim 19, in which at least one of an automatic player system and a silent system is incorporated in said acoustic piano.

* * * * *